UNITED STATES PATENT OFFICE.

EDWARD D. GLEASON, OF NEW YORK, N. Y., ASSIGNOR TO PLASTIC METAL COMPANY, OF NEW YORK, N. Y., A CORPORATION OF NEW YORK.

PROCESS OF MAKING LEAD-COPPER-TIN COMPOSITIONS.

1,077,701. Specification of Letters Patent. Patented Nov. 4, 1913.

No Drawing. Original application filed March 7, 1913, Serial No. 752,600. Divided and this application filed April 4, 1913. Serial No. 758,833.

*To all whom it may concern:*

Be it known that I, EDWARD D. GLEASON, a citizen of the United States, residing in Brooklyn, in the county of Kings, city and State of New York, have invented a certain new and useful Improvement in Processes of Making Lead-Copper-Tin Compositions, whereof the following is a specification.

This application is a division of my application Serial 752,600, filed March 7, 1913, for Letters Patent of the United States for improvement in lead-copper-tin compositions.

My invention relates to plastic compositions including lead-copper and tin, which may be advantageously used in the manufacture of bearings for shafts, etc.

It is an object of my invention to provide such compositions free from "lead sweats" and segregation, which are defects usually found in such compositions due to lack of affinity of the lead for the copper or copper and tin, and the high specific gravity and low melting point of lead, for, at best, such compositions are but mechanical mixtures wherein copper is held in a finely divided state in a matrix of lead.

Another object of my invention is to provide such compositions including a given percentage of copper but of different degrees of hardness.

The effect of my improvement is to provide a composition which is homogeneous in that the copper therein is comminuted to the greatest possible extent and equally distributed throughout the mass of the composition. I have discovered that the effect aforesaid is attained by fusing with the composition a non-metallic derivative of one of the composition metals capable of increasing its miscibility, for instance, by adding sulfid to the molten copper in the process of making such compositions, particularly the native lead sulfid, galena. For instance, I fuse 60 pounds of copper and add thereto 5 pounds of galena and then gradually add, to said mixture, 30 pounds of lead and 5 pounds of tin. The fused mixture is then poured into pig, ingot or other suitable molds, and, when congealed, fracture thereof shows that the cast metal is homogeneous.

It may be observed that such a mixture, without the galena, forms castings in which the tin is segregated forming strata. In other words, fusion with a non-metallic derivative of the other metal, to wit, lead sulfid, increases the miscibility of tin with that metal, and with the other metals of the composition, so that the latter is thus rendered homogeneous as described.

Compositions of copper and lead, without tin, form the subject matter of my application Serial 752,601, filed March 7, 1913, for Letters Patent of the United States.

I do not desire to limit myself to the precise methods of procedure or proportions herein set forth as it is obvious that various modifications may be made therein without departing from my invention as defined in the appended claims.

I claim:—

1. A process of making a composition of copper, lead and tin which consists in fusing said metals with lead sulfid and thereby increasing the miscibility of said metals.

2. A process of making a composition which consists in fusing lead sulfid with copper and then adding lead and tin thereto and fusing the mixture.

3. A process of making a composition containing tin and another metal, which consists in fusing therewith a non-metallic derivative of the other metal, capable of increasing the miscibility of tin with that metal.

4. A process of making a composition containing tin and another metal which consists in fusing therewith a sulfid of the other metal, capable of increasing the miscibility of tin with that metal.

5. A process of making a composition of copper, lead and tin, which consists in fusing said metals with a non-metallic derivative of one of them, capable of increasing the miscibility of said metals.

In testimony whereof, I have hereunto signed my name at Brooklyn, New York, this first day of April 1913.

EDWARD D. GLEASON.

Witnesses:
BENJAMIN ZEKOWSKI,
TONY ZEKOWSKI.